SOLID STATE SPACE DIVISION CIRCUIT

Filed July 21, 1966 3 Sheets-Sheet 1

INVENTOR.
BARRIE BRIGHTMAN
BY
Hoffman Stone
ATTORNEY

Jan. 13, 1970 B. BRIGHTMAN 3,489,856

SOLID STATE SPACE DIVISION CIRCUIT

Filed July 21, 1966 3 Sheets-Sheet 2

INVENTOR.
BARRIE BRIGHTMAN

INVENTOR.
BARRIE BRIGHTMAN
BY Hoffman Stone
ATTORNEY

United States Patent Office 3,489,856

Patented Jan. 13, 1970

3,489,856

SOLID STATE SPACE DIVISION CIRCUIT

Barrie Brightman, Webster, N.Y., assignor to Stromberg-Carlson Corporation, Rochester, N.Y., a corporation of Delaware Filed July 21, 1966, Ser. No. 566,830
Int. Cl. H04m 3/22
U.S. Cl. 179—18 9 Claims

ABSTRACT OF THE DISCLOSURE

A link circuit for a telephone exchange including four matrices of transistors. Subscribers' lines are connected directly to the transistors, one side of each line being connected to a transistor in a first one of the matrices and to a transistor in a second one of the matrices. The other side of the line is connected to respective transistors in the third and fourth matrices. The bases of all the transistors in each column are connected to a common column selector lead. The emitters of all the transistors in a row are connected together and in series with a gating transistor. The bases of the gating transistors are connected to separate row selector leads. Marking of one column selector lead and one row selector lead in a matrix drives one transistor to saturation.

This invention relates to a novel electronic switch for communications systems such as telephone exchanges and switchboards, and more particularly, but not exclusively, to a novel space divided switching system especially suitable for use in a so-called electronic telephone exchange.

In general, there are two principal types of switching systems for effecting connections between calling and called subscriber telephones through electronic exchanges. All of the conversations may be routed through a common conductor on a time shared basis. This is called a time divided (TDM) system. Alternatively, the connections may be made through separate conductive paths, in which case the exchange is called space divided. Many of the functions, especially those relating to control, in a space divided electronic exchange may be carried out with TDM methods and on a time shared basis. The term space division as used herein refers solely to the connections between the various different pairs of subscribers' telephones that must be effected to put through telephone calls. In a space divided system, the two telephones in use during a call are connected to each other on a continuous basis. In a TDM system, on the other hand, the two telephones are connected to each other on a discontinuous basis, only once during each repetitive time frame of the TDM timing system. In general, however, substantially similar control systems may be used for operating either a TDM or a space divided system.

One major problem in the design of a space divided switching matrix for an electronic telephone exchange relates to what is known as insertion loss, that is, attenuation of a signal by reason of its having passed through the matrix. It is also desirable for economic reasons to minimize the amount of hardware required, not only in the matrix, but also in other parts of the exchange through which the signals pass.

The system of the invention has been shown to have a very low insertion loss, very little more than that of a typical electro-mechanical relay system, and significantly less than that of other electronic systems heretofore proposed. It also permits the omission of a considerable amount of auxiliary equipment that has been generally required in space divided systems of the prior art such as, for example, circuits individual to each line for isolating the lines from the D.C. conditions in the switching system.

In its broad aspect, the invention contemplates the use of a transistor as a switching device alternately to open and close a conductive path for electrical signals. The transistor is arranged to be energized from a source connected across its emitter and collector terminals, and to be controlled by application of a biasing potential to its base electrode. The signals to be switched are applied across the collector and emitter terminals. The transistor effectively opens the conductive path when it is biased to cutoff. To close the path, the transistor is biased to saturation, in which condition it acts very much like an ordinary conductor, and passes signals in both directions so long as it remains conducting in the forward direction. The saturation current is preferably larger than the maximum instantaneous value of the alternating signal currents for which the circuit is designed. The current flowing in the transistor may be described as a D.C. current with an A.C. signal superimposed, and for optimum operation, the peak amplitude of the A.C. signal in the back direction is not allowed to exceed the value of the D.C. current.

The invention also contemplates a matrix of such switches in a balanced circuit configuration, and a novel coordinate selection arrangement. For coordinate selection, the transistors of each row of the matrix are connected in common to another transistor switch, conveniently called a gate, and the transistors in each column are connected in common to a single bias source. To pass a selected signal through the matrix, all transistors are forward biased in the column that includes the transistor to which the desired signal is applied, and only that gate is forward biased to which the particular transistor is connected.

The switch and system of the invention have been found to be highly efficient in operation, and to be readily adaptable for control by various different common control systems. When used in a telephone exchange, or switchboard, it obviates the need for a considerable amount of extra circuitry that has been required with space divided sytems heretofore proposed, particularly the line circuits heretofore required for isolating individual subscribers' lines from the D.C. conditions in the switching matrix. The practice of the invention enables the elimination of such line circuits, thereby effecting substantial savings in equipment costs and a significant improvement in efficiency by reason of the resulting reduction of insertion loss of the system. In accordance with the invention, the individual subscribers' lines are connected directly to the terminals of the switching transistors, and scanning of the lines to detect off-hook conditions is accomplished by operating the transistors in predetermined sequence.

A representative embodiment of the invention will now be described in detail in conjunction with the accompanying drawings, wherein.

Figure 1:
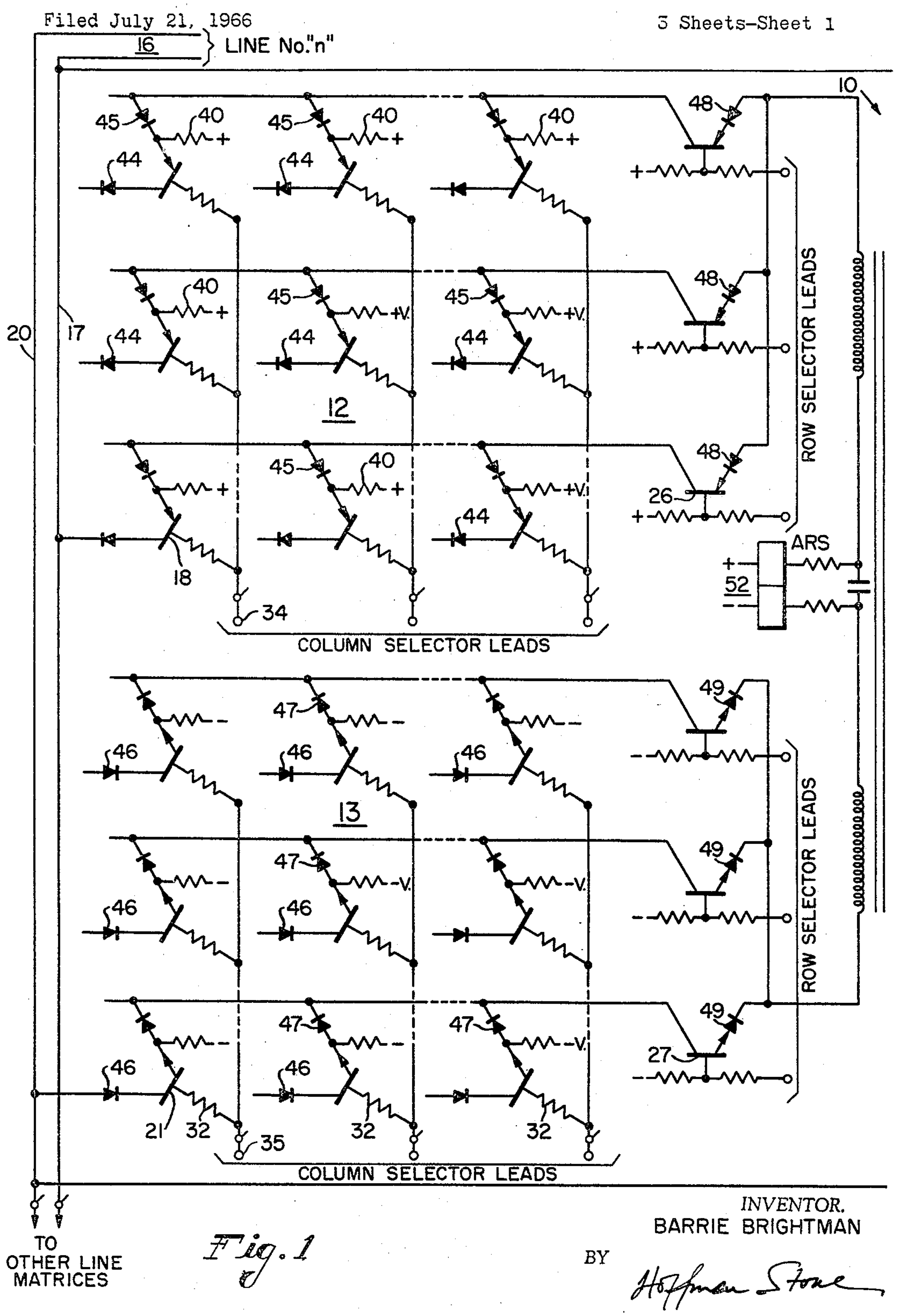
FIGURE 1 is a schematic diagram of a first part of a link circuit in accordance with the present invention.
Figure 2:
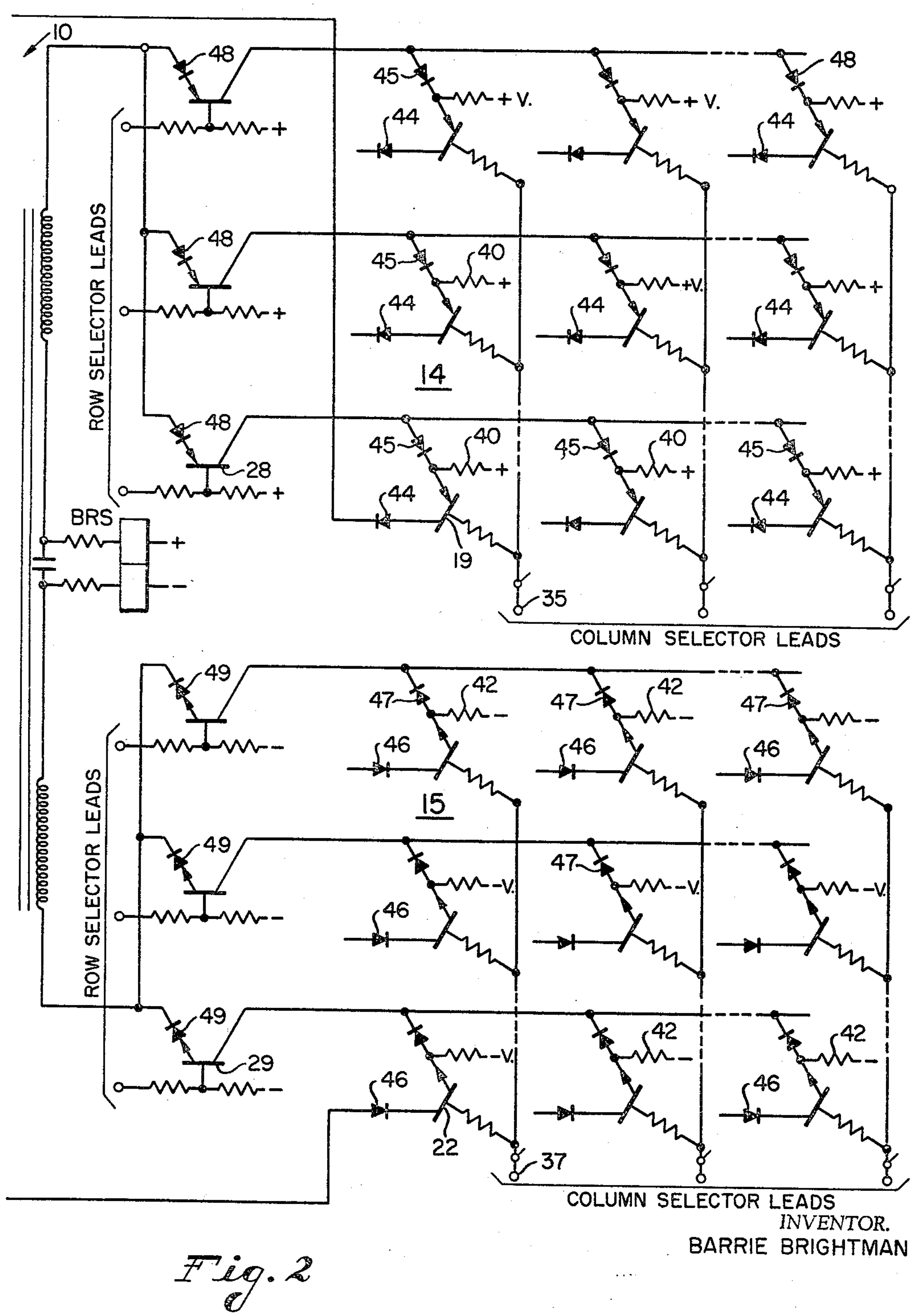
FIGURE 2 is a schematic diagram of the rest of the link circuit.

FIGURES 1 and 2 show a link circuit of the balanced type according to the invention. One such circuit would be included in an exchange, or switchboard, for each separate simultaneous connection it is desired to provide for. For example, a switchboard serving 100 lines might include twelve link circuits, so that twelve separate connections could be made simultaneously through the switchboard. The circuit shown includes a standard transformer bridge 10, and two line loop current detector relays ARS and BRS. The first relay ARS is associated with the calling party, and the second relay BRS is associated with the called party. The switching arrangement is balanced, that is, both of the wires that constitute each subscriber's lines are switched.

As shown, the circuit includes four matrices, 12, 13, 14, and 15, respectively, each of which includes one hundred transistors in a ten-by-ten array. Two matrices 12 and 13 are in the calling portion of the link shown in FIGURE 1, and two matrices 14 and 15 are in the called portion shown in FIGURE 2. Each matrix includes a transistor for each line served by the exchange, or by that portion of the exchange served by the link, and each line is connected to one transistor in each matrix. Only a single line 16, line numbered *n* is shown by way of example. One lead 17 of the line is connected to the collectors (not separately designated) of corresponding transistors 18 and 19 in corresponding PNP matrices 12 and 14 on opposite sides of the transformer 10 in all of the links of the system. The other lead 20 of the line is connected to the collectors of the corresponding NPN transistors 21 and 22 in the other two matrices 13 and 15 in all the links.

The emitters of all the transistors in each row are connected together and to the collector of a gate transistor, such as the transistors designated 26, 27, 28, and 29, respectively. The emitters of all of the gate transistors associated with each matrix are connected together and to respective terminals of the bridge transformer 10.

The bases of all the transistors in each column in the matrices 12–15 are connected through the individual resistors 32 to respective column bias leads such as the leads designated 34, 35, 36, and 37, respectively.

Operating current for the PNP transistors in the two upper matrices 12 and 14 is provided by connecting the emitter of each transistor to a source +V of electricity at a potential positive relative to ground through an individual load resistor 40. The NPN transistors in the two lower matrices 13 and 15 are supplied by connecting their emitters through individual load resistors 42 to a source of electricity at a potential negative relative to ground.

The bases of the PNP gate transistors connected to the PNP matrices 12 and 14 are normally biased positively, and the bases of the NPN gate transistors conneced to the NPN matrices 13 and 15 are normally biased negatively relative to ground, sufficiently so that in the normal, of OFF condition, the transistors are cut off.

Appropriately oriented diodes 45, 47, 48, 49, respectively, are connected in series with the emitters of the transistors in the matrices and of the gate transistors for protecting the base-to-emitter junction from the effects of the application of voltages in the reverse direction greater than their breakdown voltages.

Diodes 44 and 46, respectively, are connected in series with the collectors of the PNP and the NPN transistors in the matrices to enable the application of a greater cut-off bias to them than would otherwise be feasible, so that transients generated by switching in adjacent links will not be transmitted through the cut-off transistors.

The transistors and diodes act simply as switches in the signaling paths. When the transistors are forward biased, they establish conductive paths of low impedance between their collectors and emiters capable of transmitting alternating current signals in both directions with a high degree of efficiency.

It will be seen that when a subscriber goes off-hook, and his line is interrogated by a line finder device, which forward biases the appropriate pair of transistors in the calling matrices 12 and 13, and the appropriate pair of the gates associated with these matrices, a D.C. conductive path is established between the output terminals of the exchange battery 52. This path may be traced in the case of the line 16 numbered *n*, for example, through the first half of the coil of the line loop current detector relay ARS, the upper half of the left hand winding of the bridge transformer 10, the gate transistor 26, the transistor 18 at the lower left hand corner of the calling PNP matrix 12, the subscriber's line and hook switch, the transistor 21 at the lower left hand corner of the calling NPN matrix, the gate transistor 27, the lower half of the winding of the bridge transformer, and the second coil of the line loop current detector relay ARS.

Under these circumsances, therefore, the detector relay ARS operates to seize the link for the particular subscriber's line, and also to seize the appropriate circuits in the common control system of the exchange. The circuit just traced also steers all signals from the subscriber's line to the bridge transformer 10, and when a similar connection is made to another line through the called matrices 14 and 15, the two lines are connected through the bridge transformer.

In the circuit as shown, during times when a subscriber is on-hook, there is no bias across the collector junctions of the transistors to which his line is connected. In the "normal" condition, the collectors are electrically floating, and there is no energizing voltage present between the collectors and emitters. The transistors are positively cut-off by the bias applied across their emitter junctions to prevent undesired transmission of transients and crosstalk.

When the subscriber goes off-hook, his hook switch establishes a D.C. conductive path between the collector of a transistor in the PNP calling matrix 12 and the collector of the corresponding transistor in the NPN calling matrix 13, thus automatically applying the energizing voltage to both of the transistors because the energizing supply voltage is present between the emitters of the respective transistors.

Any desired control system may be used for operating the matrix by applying the selecting bias voltages to the desired columns of transistors in the matrices 12–15, and to the desired ones of the gate transistors. This is simply a matter of generating coordinate switching signals, and is well within the skill of the art.

Although in the preferred form of the invention, as shown and described, the subscriber's lines are connected to the collectors of the transistors, and all of the emitters are on the side toward the bridge transformer 10, it will be appreciated that this arrangement may be reversed, and the collectors in one or more of the matrices connected to face the transformer. All that is required for such reversal is the appropriate change in polarity of the energizing and biasing source.

Also, although the link as shown includes two PNP and two NPN matrices, this again is largely a matter of designer's choice. By appropriately orienting the transistors, and selecting energizing and bias sources of appropriate polarity, the matrices may be made, as desired, of PNP or NPN transistors. It is thought, however, that the symmetrical arrangement shown is advantageous in that it achieves de-energization of the transistors by the subscribers' hook switches, as described, so that the transistors remain quiescent except when actually in use for signalling. It is also thought that the described arrangement tends to provide for quieter operation than would be otherwise achievable and to minimize the effects of the transients in the system.

Figure 3:
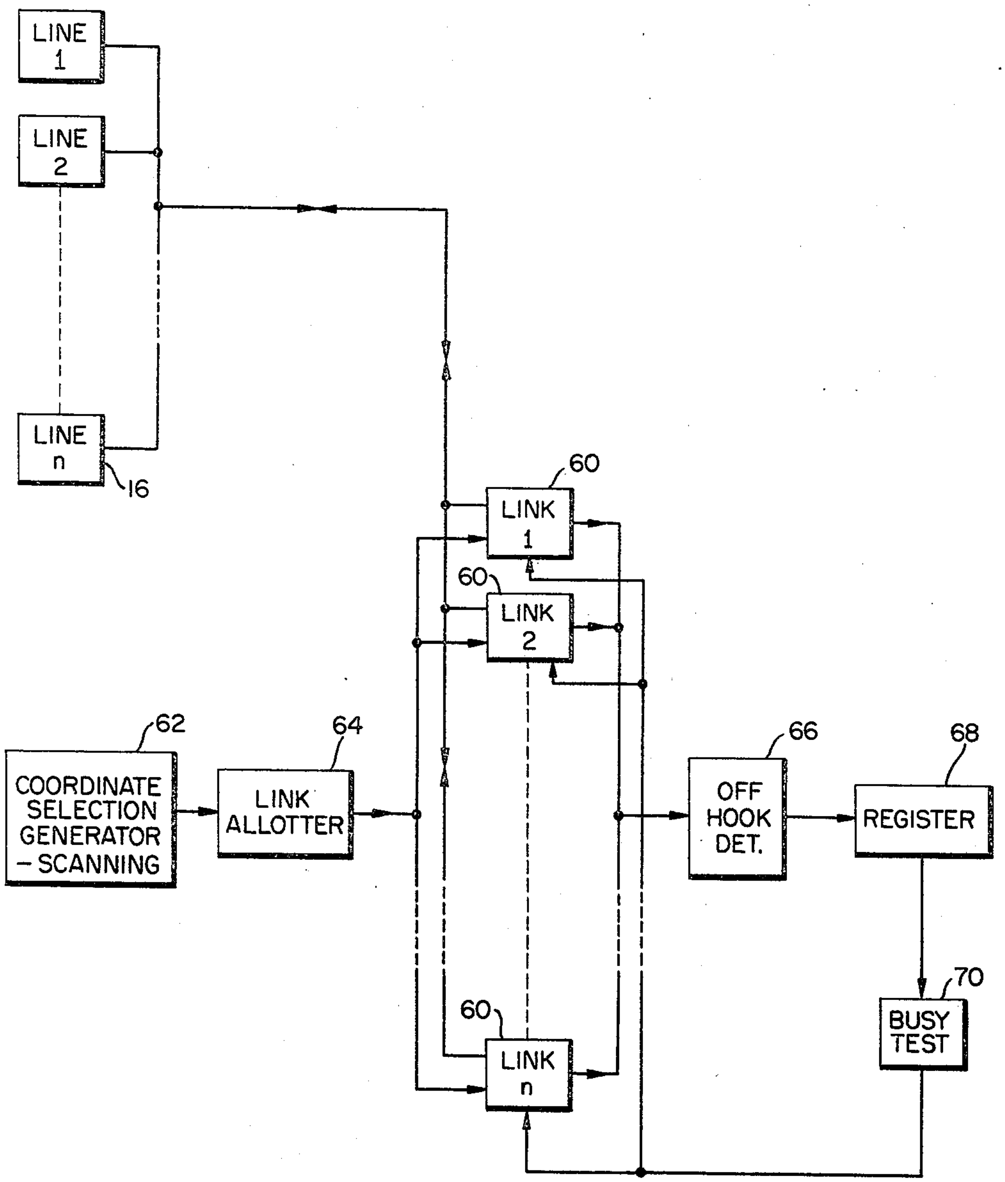
FIGURE 3 is a block diagram of a switching system according to the invention, particularly showing the subscribers' lines connected directly to the link circuits.

FIGURE 3 illustrates in a general way the manner in which the link circuits of the invention may be incorporated in an electronic exchange or switchboard without the need to include line circuits individually isolating the various different subscriber's lines. All of the lines served by the exchange are connected to all of the links 60. Coordinate selection control signals are produced by a generator 62 for operating the transistors in a pair of calling matrices such as the matrices 12 and 13 (FIG. 1) in one of the links 60 to scan the subscriber's lines until one is found in an off-hook condition. An allotter 64 directs the coordinate control signals to an idle one of the links 60, that is, to a link that is not in use by a subscriber. When a line is found to be off-hook, the ARS relay in the link operates to seize the link for the off-hook subscriber and the allotter 64 steps to another, idle one of the links 60.

An off-hook detector circuit 66 directs dial tone to the off-hook subscriber, and feeds dialing signals from the subscriber's line to a register 68. The register 68 produces coordinate selection signals for application first to a "busy" detector 70, and then to the "called" matrices 14 and 15 of the link if the called line is not off-hook. In the event the called line is off-hook, the "busy" detector 70 directs busy tone to the calling line.

Means (not shown) are also provided for applying ringing signals to the links 60 for signalling the called parties, and for other functions, as desired.

As will be appreciated, by those familiar with the art, any of several different circuit arrangements may be used to perform the functions indicated in FIGURE 3. Such circuits do not constitute a part of the present invention, which is directed primarily to the link circuit shown in FIGURES 1 and 2, and includes the concept of connecting the subscribers' lines directly into the central switching matrix, thereby achieving a substantial simplification of circuitry, a large reduction in the quantity of equipment used in an exchange relative to what was heretofore thought necessary, and improved efficiency of signal transmission.

What is claimed is:

1. A switching matrix for a telephone exchange or the like comprising a plurality of transistors in a coordinate array, one of the collector and emitter terminals of all the transistors in each row of said array being connected to a common point, means for applying electrical signals between said common point and the other ones of said terminals, auxiliary switches individually connected between each one of said common points and a common output terminal, means for connecting a source of energizing current through said auxiliary switches across the collector and emitter terminals of said transistors, and coordinate selection means including bias control means for switching all of said transistors in a selected column from a cut-off bias to saturation and operating a selected one of said auxiliary switches.

2. A balanced link circuit for switching in a telephone exchange or the like comprising:

(a) a bridge transformer, (b) a pair of calling matrices connected across one winding of said transformer, (c) a pair of called matrices connected acoss the other winding of said transformer, (d) one matrix of each of said pairs being a coordinate array of PNP transistors, the other matrix of each said pairs being a coordinate array of NPN transistors, (e) plural switching transistors connected between each of said matrices and a separate respective terminal of said transformer, there being one switching transistor for each row of transistors in each matrix, (f) means connecting one lead of each of plural signal input lines to the collectors of corresponding respective transistors in said PNP matrices, and the second lead of each line to the collectors of corresponding respective transistors in said NPN matrices, (g) means connecting the emitters of all the transistors in each respective row of said matrices together and to the collector of one of said switching transistors, (h) means connecting the emitters of all said switching transistors associated with each respective one of said matrices in common to a terminal of said transformer, (i) means for energizing all of said transistors, (j) means normally biasing all of said transistors to cut-off; and (k) coordinate selection means for selectively biasing all the transistors in corresponding single columns of one pair of said matrices to saturation and simultaneously biasing to saturation corresponding ones of said switching transistors associated with said one pair of matrices.

3. In a telephone system of the kind including a switching office, telephones remote from the office, and conductive lines connecting the telephones to the office, the improvement comprising a switching matrix at the switching office including an array of solid state electronic devices, and direct current conductive means permanently connecting the lines to respective ones of said devices.

4. In a telephone system of the kind including a switching office, telephones remote from the office, and conductive lines connecting the telephones to the office, the improvement comprising a switching matrix at the switching office including an array of transistors, and direct current conductive means permanently connecting the lines to respective ones of said transistors.

5. A switching circuit for a telephone exchange or the like comprising a plurality of terminals for connection to individual subscribers' lines, first and second calling matrices, first and second called matrices, each of said matrices including an array of transistors, a bridging transformer, means connecting said calling matrices across one winding of said transformer, means connecting said called matrices across the opposite winding of said transformer, means for energizing said transistors by applying a D.C. voltage across their emitter and collector terminals, control means for alternately biasing selected ones of said transistors to cut-off and to saturation, and direct current conductive paths connecting each of said terminals to a separate one of said transistors in each of a calling and a called matrix.

6. A switching circuit for a telephone exchange or the like comprising a plurality of terminals for connection to individual subscribers' lines, first and second calling matrices, first and second called matrices, each of said matrices including an array of transistors, a bridging transformer, means connecting said calling matrices across one winding of said transformer, means connecting said called matrices across the opposite winding of said transformer, means for energizing said transistors by applying a D.C. voltage across their emitter and collector terminals, control means for alternately biasing selected ones of said transistors to cut-off and to saturation, and direct current conductive paths connecting each of said terminals to the collector of a separate one of said transistors in each of a calling and a called matrix, the emitters of said transistors being connected to said transformer.

7. A switching arrangement for a telephone exchange or the like comprising a PNP transistor, an NPN transistor, a pair of terminals for connection to the two leads of a subscriber's line, a D.C. path connecting one of said terminals to one of the emitter and collector of said PNP transistor, a D.C. path connecting the other one of said terminals to the corresponding electrode of said NPN transistor, a D.C. power source, means connecting the output of said source across the other ones of the emitters and collectors of said PNP and NPN transistors so that when said terminals are electrically connected together the emitter-to-collector paths through said transistors are in series across said power source and when said terminals are disconnected from each other no energizing voltage appears between the emitter and collector electrodes of either one of said transistors.

8. A switching arrangement for a telephone exchange or the like comprising a PNP transistor, an NPN transistor, a pair of terminals for connection to the two leads of a subscriber's line, a D.C. conductive path connecting one of said terminals to the collector of said PNP transistor, a D.C. conductive path connecting the other one of said terminals to the collector of said NPN transistor, a D.C. power source, means connecting the output of said source between the emitter of said PNP transistor and the emitter of said NPN transistor, whereby operation of the hook switch of the subscriber's telephone alternately opens and closes the emitter-to-collector circuits of said transistors.

9. A switching circuit for a telephone exchange or the like comprising a plurality of terminals for connection directly to individual subscribers' lines, first and second calling matrices, first and second called matrices, each of said matrices including an array of transistors, A.C. coupling means connected between said calling and said called matrices, means for energizing said transistors by applying a D.C. voltage across their emitter and collector terminals, control means for alternately biasing selected ones of transistors to cut-off and to saturation, and direct current conductive paths permanently connecting each of said terminals to a separate one of said transistors in each of a calling and a called matrix.

References Cited

UNITED STATES PATENTS

| | | | |
|---|---|---|---|
| 3,336,442 | 8/1967 | Casterline et al. | |
| 3,311,708 | 3/1967 | De Kroes. | |
| 3,343,129 | 9/1967 | Schmitz | 340—166 |

KATHLEEN H. CLAFFY, Primary Examiner

W. A. HELVESTINE, Assistant Examiner